(12) United States Patent
Soga (10) Patent No.: US 11,414,512 B2
(45) Date of Patent: Aug. 16, 2022

(54) PHOTOCURABLE RESIN COMPOSITION, FUEL CELL USING SAME, AND SEALING METHOD

(71) Applicant: THREEBOND CO., LTD., Hachioji (JP)

(72) Inventor: Tetsunori Soga, Hachioji (JP)

(73) Assignee: THREEBOND CO., LTD., Hachioji (JP)

( * ) Notice: Subject to any disclaimer, the term of this patent is extended or adjusted under 35 U.S.C. 154(b) by 455 days.

(21) Appl. No.: 16/604,290

(22) PCT Filed: Apr. 13, 2018

(86) PCT No.: PCT/JP2018/015507
§ 371 (c)(1),
(2) Date: Oct. 10, 2019

(87) PCT Pub. No.: WO2018/190415
PCT Pub. Date: Oct. 18, 2018

(65) Prior Publication Data
US 2020/0048389 A1    Feb. 13, 2020

(30) Foreign Application Priority Data
Apr. 14, 2017 (JP) .............................. JP2017-080209

(51) Int. Cl.
*C08F 290/04* (2006.01)
*C09J 151/06* (2006.01)
(Continued)

(52) U.S. Cl.
CPC ......... *C08F 290/042* (2013.01); *C09J 151/06* (2013.01); *H01M 8/0273* (2013.01); *H01M 8/0284* (2013.01); *H01M 2008/1095* (2013.01)

(58) Field of Classification Search
None
See application file for complete search history.

(56) References Cited

U.S. PATENT DOCUMENTS

| 5,171,760 A | 12/1992 | Kaszas et al. |
| 2005/0003257 A1* | 1/2005 | Willimowski .... H01M 8/04089 429/513 |

(Continued)

FOREIGN PATENT DOCUMENTS

| CA | 2994085 A1 | 2/2017 |
| CA | 2995835 A1 | 2/2017 |

(Continued)

OTHER PUBLICATIONS

English translation of Written Opinion for International Application No. PCT/JP2018/015507 (Year: 2018).*

(Continued)

*Primary Examiner* — Alix E Eggerding
(74) *Attorney, Agent, or Firm* — Manabu Kanesaka (57) ABSTRACT

The present invention aims to provide a photocurable resin composition which rapidly cures by irradiation with active energy rays such as ultraviolet rays and is excellent in adhesion to an electrolyte membrane which is a hard-to-bond material. A photocurable resin composition includes the following ingredients (A) to (C): ingredient (A): a polymer having one or more (meth)acryloyl groups and having a polyisobutylene skeleton containing a —[$CH_2C(CH_3)_2$]— unit, ingredient (B): a photoradical polymerization initiator, and ingredient (C): a compound having a (meth)acryloyl group and a cationic polymerizable functional group in one molecule.

20 Claims, 1 Drawing Sheet

(51) Int. Cl.
*H01M 8/0273* (2016.01)
*H01M 8/0284* (2016.01)
*H01M 8/10* (2016.01)

(56) References Cited

U.S. PATENT DOCUMENTS

| | | | |
|---|---|---|---|
| 2005/0043480 A1 | 2/2005 | Osawa | |
| 2006/0052546 A1 | 3/2006 | Morikawa et al. | |
| 2007/0066699 A1 | 3/2007 | Kohno et al. | |
| 2009/0004541 A1* | 1/2009 | Jacobine | H01M 8/0258 264/494 |
| 2009/0162715 A1* | 6/2009 | Burdzy | H01M 8/0284 429/508 |
| 2009/0176953 A1 | 7/2009 | Morikawa et al. | |
| 2010/0155247 A1 | 6/2010 | Cao et al. | |
| 2013/0287980 A1* | 10/2013 | Burdzy | C09J 4/00 156/327 |
| 2014/0190736 A1 | 7/2014 | Cao et al. | |
| 2015/0166858 A1* | 6/2015 | Goubard | C08G 18/4825 156/329 |
| 2016/0254559 A1 | 9/2016 | Nakano et al. | |
| 2016/0285120 A1 | 9/2016 | Nakano et al. | |
| 2017/0051093 A1* | 2/2017 | Ikari | C08F 110/10 |
| 2017/0335026 A1 | 11/2017 | Motoike | |
| 2018/0226664 A1 | 8/2018 | Soga et al. | |
| 2018/0241056 A1 | 8/2018 | Soga et al. | |
| 2018/0244870 A1 | 8/2018 | Soga et al. | |

FOREIGN PATENT DOCUMENTS

| | | |
|---|---|---|
| JP | H02-88614 A | 3/1990 |
| JP | 11-162442 A | 6/1999 |
| JP | 2001-105548 A | 4/2001 |
| JP | 2001-348328 A | 12/2001 |
| JP | 2002-060484 A | 2/2002 |
| JP | 2004-075824 A | 3/2004 |
| JP | 2004-111146 A | 4/2004 |
| JP | 2005-149815 A | 6/2005 |
| JP | 2007-100099 A | 4/2007 |
| JP | 2009-531516 A | 9/2009 |
| JP | 2011-124258 A | 6/2011 |
| JP | 2013-216782 A | 10/2013 |
| JP | 2015-002029 A | 1/2015 |
| KR | 101254536 B1 | 4/2013 |
| WO | 02/17421 A2 | 2/2002 |
| WO | 2005/028537 A1 | 3/2005 |
| WO | 2016/080409 A1 | 5/2016 |
| WO | 2017/038340 A1 | 3/2017 |

OTHER PUBLICATIONS

Europe Patent Office, "Search Report for European Patent Application No. 18784359.4," dated Oct. 19, 2021.
PCT/ISA/210, "International Search Report for International Application No. PCT/JP2018/015507," dated Jul. 3, 2018.
Europe Patent Office, "Search Report for European Patent Application No. 18784359.4," dated Nov. 27, 2020.
Europe Patent Office, "Office Action for European Patent Application No. 18784359.4," dated May 27, 2022.

* cited by examiner

PHOTOCURABLE RESIN COMPOSITION, FUEL CELL USING SAME, AND SEALING METHOD

RELATED APPLICATIONS

The present application is National Phase of International Application No. PCT/JP2018/015507 filed Apr. 13, 2018, and claims priority from Japanese Application No. 2017-080209, filed Apr. 14, 2017, the disclosure of which is hereby incorporated by reference herein in its entirety.

TECHNICAL FIELD

The present invention relates to a photocurable resin composition.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and generates only water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operating temperature is relatively low temperature (around 80° C.), and therefore is expected for usages such as power sources for automobiles, power generators for households, small power sources for electronic equipment such as mobile phones, and power sources for emergency.

Figure 1:
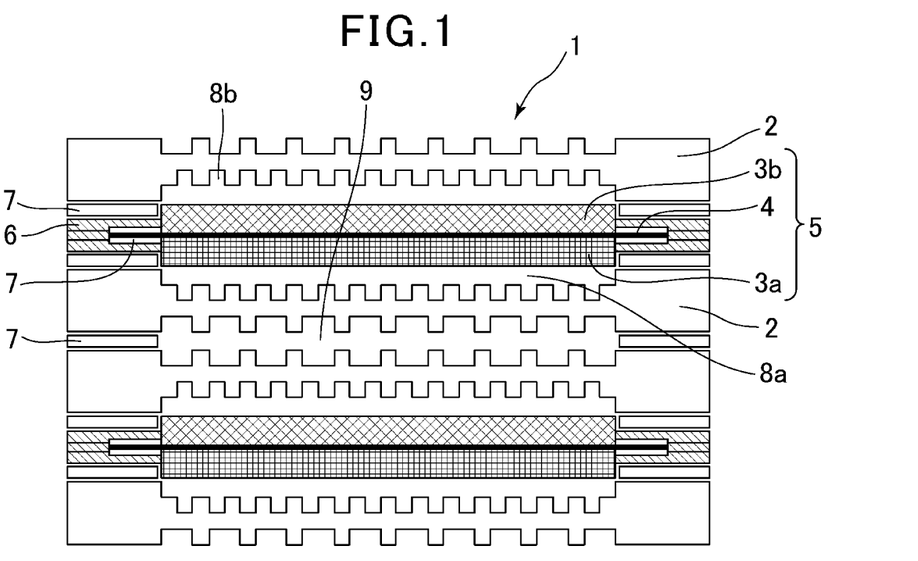
FIG. 1 is a schematic cross sectional view of a single cell of a fuel cell.

As illustrated in FIG. 1, a cell 1 of a solid polymer fuel cell has a structure including: an electrolyte membrane electrode assembly 5 (MEA) structured such that a polymer electrolyte membrane 4 is nipped between an air electrode 3a and a fuel electrode 3b; a frame 6 which supports the MEA; and separators 2 by which gas flow paths are formed.

In order to activate the solid polymer fuel cell, it is necessary to supply a fuel gas containing hydrogen to an anode electrode and supply an oxidation gas containing oxygen (oxygen gas) to a cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and so on. Specifically, the sealing agent is used between adjacent separators, between a separator and a frame, between a frame and an electrolyte membrane or MEA, and so on.

As to sealing agents for use in solid polymer fuel cells, studies have been made on: a thermosetting resin composition which uses a polyisobutylene-based polymer and causes a hydrosilylation reaction (see Patent Literature 1); a thermosetting resin composition which uses a fluoropolyether compound and causes a hydrosilylation reaction (see Patent Literature 2); a thermosetting resin composition which uses a fluoropolymer and causes a hydrosilylation reaction (see Patent Literature 3); and a thermosetting resin composition which uses an ethylene-propylene-diene rubber (see Patent Literature 4) as these compositions are rubber elastic bodies being excellent in gas permeation resistance, low moisture permeability, heat resistance, acid resistance, and flexibility. However, since the heat curable resin compositions of Patent Literatures 1 to 4 require a heating step for curing, there are problems that process time is required and the electrolyte membrane has a risk of deterioration due to heating.

In view of the above, attention has been paid to a photocurable resin composition which achieves shortening of the process and is capable of preventing deterioration of an electrolyte membrane due to heat. Patent Literatures 5 and 6 disclose photocurable sealing agents containing polyisobutylene diacrylate, a (meth)acrylic monomer, and a photoinitiator.

CITATION LIST

Patent Literatures

Patent Literature 1: Japanese Patent Application Publication No. 2004-111146
Patent Literature 2: Japanese Patent Application Publication No. 2004-075824
Patent Literature 3: Japanese Patent Application Publication No. 2007-100099
Patent Literature 4: Japanese Patent Application Publication No. 2011-124258
Patent Literature 5: Published Japanese Translation of PCT International Application No. 2009-531516
Patent Literature 6: Japanese Patent Application Publication No. Hei 2-88614

SUMMARY OF INVENTION

However, the photocurable resin compositions disclosed in Patent Literatures 5 and 6 contain polyisobutylene diacrylate as a main ingredient in order to obtain sealability, but are insufficient in photocurability. In addition, the photocurable resin compositions disclosed in Patent Literatures 5 and 6 are mainly composed of polyisobutylene diacrylate having a low polarity in order to obtain sealability, but have a problem that the adhesion to various members is inferior due to the polarity of the molecular structure. Moreover, the polymer electrolyte membrane of a fuel cell is made of fluorine-based polymer, which is a material extremely difficult to bond with a conventional sealant. For this reason, it is all the more difficult to bond it with the photocurable resin compositions of Patent Literatures 5 and 6.

The present invention has been made in view of the above circumstances, and aims to provide a photocurable resin composition which rapidly cures by irradiation with light such as ultraviolet rays (active energy rays) and is excellent in adhesion to an electrolyte membrane which is a hard-to-bond material.

Means for Solution of the Problems

The gist of the present invention is described next.
[1] A photocurable resin composition comprising the following ingredients (A) to (C):
  ingredient (A): a polymer having one or more (meth)acryloyl groups and having a polyisobutylene skeleton containing a —[$CH_2C(CH_3)_2$]— unit,
  ingredient (B): a photoradical polymerization initiator, and
  ingredient (C): a compound having a radical polymerizable functional group and a cationic polymerizable functional group in one molecule.

[2] The photocurable resin composition according to [1], wherein the radical polymerizable functional group of the ingredient (C) is a (meth)acryloyl group.

[3] The photocurable resin composition according to [1] or [2], wherein the cationic polymerizable functional group of the ingredient (C) is a compound having a glycidyl group or a vinyl ether group.

[4] The photocurable resin composition according to any one of [1] to [3], wherein the ingredient (A) is a polymer having a polyisobutylene skeleton represented by general formula (1):

where $R^1$ represents a monovalent or polyvalent aromatic hydrocarbon group, or a monovalent or polyvalent aliphatic hydrocarbon group, PIB represents the polyisobutylene skeleton containing the —[$CH_2C(CH_3)_2$]— unit, $R^4$ represents a divalent hydrocarbon group having 2 to 6 carbon atoms and optionally containing an oxygen atom, $R^2$ and $R^3$ each independently represent a hydrogen atom or a monovalent hydrocarbon group having 1 to 20 carbon atoms, $R^5$ represents a hydrogen atom, a methyl group, or an ethyl group, and n is an integer from 1 to 6.

[5] The photocurable resin composition according to any one of [1] to [4], further comprising a (meth)acrylate monomer as an ingredient (D).

[6] The photocurable resin composition according to [5], wherein the ingredient (D) is a (meth)acrylate monomer which has an alkyl group having 5 to 30 carbon atoms or an alicyclic group having 5 to 30 carbon atoms.

[7] The photocurable resin composition according to any one of [1] to [6], wherein the ingredient (C) is contained at 0.1 to 100 parts by mass relative to 100 parts by mass of the ingredient (A).

[8] A photocurable sealing agent for a fuel cell comprising the photocurable resin composition according to any one of [1] to [7].

[9] The photocurable sealing agent for a fuel cell according to [8], wherein the photocurable sealing agent for a fuel cell is a photocurable sealing agent for a fuel cell for a periphery of any member selected from the group consisting of separators, frames, electrolytes, fuel electrodes, air electrodes, and electrolyte membrane electrode assemblies, which are members in a fuel cell.

[10] The photocurable sealing agent for a fuel cell according to [8], wherein the sealing agent is a sealing agent between adjacent separators in a fuel cell or a photocurable sealing agent for a fuel cell between a frame and an electrolyte membrane or an electrolyte membrane electrode assembly in the fuel cell.

[11] The photocurable sealing agent for a fuel cell according to any one of [8] to [10], wherein the fuel cell is a solid polymer fuel cell.

[12] A cured product which is formed by photocuring the photocurable resin composition according to any one of [1] to [7] or the sealing agent according to any one of [8] to [11].

[13] A fuel cell comprising any seal selected from the group consisting of a seal between adjacent separators in the fuel cell and a seal between a frame and an electrolyte membrane or an electrolyte membrane electrode assembly in the fuel cell, wherein the any seal contains the cured product according to [12].

[14] The fuel cell according to [13], wherein the fuel cell is a solid polymer fuel cell.

[15] A method for sealing at least part of at least two flanges of seal target components including the at least two flanges, at least one of which is light-transmissive, allowing active energy rays to pass therethrough, the method comprising the steps of: applying the photocurable resin composition according to any one of [1] to [7] to a surface of at least one of the flanges; sticking the one flange with the photocurable resin composition applied thereto onto the other flange with the photocurable resin composition interposed in between; and sealing the at least part of the at least two flanges by curing the photocurable resin composition by irradiation with active energy rays through the light-transmissive flange.

[16] A method for sealing at least part of at least two flanges of seal target components including the at least two flanges, comprising the steps of: applying the photocurable resin composition according to any one of [1] to [7] to at least one of the flanges; irradiating the applied photocurable resin composition with active energy rays to cure the photocurable resin composition, thereby forming a gasket composed of a cured product of the photocurable resin composition; and sealing the at least part of the at least two flanges by placing the other flange on the gasket and pressure bonding the other flange and the one flange, to which the photocurable resin composition is applied, together with the gasket interposed in between.

[17] A method for sealing at least part of at least two flanges of seal target components including the at least two flanges, comprising the steps of: placing a gasket formation mold on at least one of the flanges; injecting the photocurable resin composition according to any one of [1] to [7] into at least part of a cavity formed between the gasket formation mold and the flange on which the mold is placed; irradiating the photocurable resin composition with the active energy rays to cure the photocurable resin composition, thereby forming a gasket composed of a cured product of the photocurable resin composition; detaching the mold from the one flange; and sealing the at least part of the at least two flanges by placing the other flange on the gasket and then pressure bonding the one and the other flanges together with the gasket interposed in between.

The present invention provides a photocurable resin composition which rapidly cures by irradiation with active energy rays such as ultraviolet rays and is excellent in adhesion to an electrolyte membrane which is a hard-to-bond material, hydrogen gas barrier property, and water vapor barrier property.

DESCRIPTION OF EMBODIMENTS

The details of the invention are described below.
<Photocurable Resin Composition>
The present invention relates to a photocurable resin composition comprising the following ingredients (A) to (C)

as well as an optional ingredient (D) ingredient (A): a polymer having one or more (meth)acryloyl groups and having a polyisobutylene skeleton containing a —[CH$_2$C(CH$_3$)$_2$]— unit, ingredient (B): a photoradical polymerization initiator, ingredient (C): a compound having a radical polymerizable functional group and a cationic polymerizable functional group in one molecule, and ingredient (D): a (meth)acrylate monomer.

It is possible to use the ingredients (A) to (D) as well as other optional ingredients in the curable resin composition of the present invention by appropriately combining ingredients satisfying any of the conditions described below. Note that the ingredients (A) to (D) are mutually different ingredients.

<Ingredient (A)>

An ingredient (A) used in the present invention is not particularly limited as long as it is a polymer having one or more (meth)acryloyl groups and having a polyisobutylene skeleton containing a —[CH$_2$C(CH$_3$)$_2$]— unit. The ingredient (A) may have, for example, a —[CH$_2$C(CH$_3$)$_2$]— unit (polyisobutylene skeleton), or may be a "constituent unit other than the —[CH$_2$C(CH$_3$)$_2$]— unit." The ingredient (A) suitably contains the —[CH$_2$C(CH$_3$)$_2$]— unit in an amount of, for example, 70% by mass or more, preferably 75% by mass or more, and more preferably 80% by mass or more relative to the total amount of the constituent units. In addition, the ingredient (A) suitably contains the —[CH$_2$C(CH$_3$)$_2$]— unit in an amount of, for example, 100% by mass or less, 95% by mass or less in another aspect, and 90% by mass or less in still another aspect. It is suitable that the ingredient (A) contains preferably 1 to 12, more preferably 2 to 8, further preferably 2 to 4, and particularly preferably 2 (meth)acryloyl groups. Note that, though not bound by theory, polymers in the present invention can be defined as a compound which has, for example, repeating units of monomers on the polymer main chain and which is composed of 100 or more repeating units. Note that the (meth)acryloyl group may be present at either the side chain and/or the end of the molecule, but is preferably present at the end of the molecule from the viewpoint of rubber elasticity.

The ingredient (A) is preferably a polymer which has a polyisobutylene skeleton represented by the following general formula (1) from the viewpoint of excellence in photocurability and adhesion to an electrolyte membrane. Specific examples of the ingredient (A) include polyisobutylene having (meth)acryloyloxy alkoxyphenyl groups. Note that, although the main skeleton of the ingredient (A) in the present invention is a polyisobutylene skeleton, the monomers constituting this polyisobutylene skeleton may include other monomers for copolymerization in addition to the mainly used isobutylene as long as the effects of the present invention are not impaired. Note that the ingredient (A) is preferably in a liquid state at room temperature (25° C.) because of excellent application workability of the photocurable resin composition.

In formula (1), R$^1$ represents a monovalent or polyvalent aromatic hydrocarbon group, or a monovalent or polyvalent aliphatic hydrocarbon group, preferably a polyvalent aromatic hydrocarbon group, and particularly preferably a divalent phenylene group. PIB represents a polyisobutylene skeleton containing the —[CH$_2$C(CH$_3$)$_2$]— unit (or composed of the —[CH$_2$C(CH$_3$)$_2$]— unit). R$^4$ represents a divalent hydrocarbon group having 2 to 6 carbon atoms and optionally containing an oxygen atom, and is preferably a divalent hydrocarbon group having 2 or 3 carbon atoms. R$^2$ and R$^3$ each independently represent a hydrogen atom or a monovalent hydrocarbon group having 1 to 20 carbon atoms, and preferably a hydrogen atom. R$^5$ represents a hydrogen atom, a methyl group, or an ethyl group, and preferably a hydrogen atom or a methyl group. Finally, n is an integer from 1 to 6, and particularly preferably an integer from 2 to 4.

For example, the molecular weight of the ingredient (A) of the present invention is, though not particularly limited, preferably 200 to 500,000, further preferably 1,000 to 100,000, and particularly preferably 3,000 to 50,000 in terms of number average molecular weight by chromatography measurement from the viewpoint of e.g. fluidity and physical properties after curing. Note that, unless otherwise specified, number average molecular weight was calculated by a standard polystyrene conversion method using size permeation chromatography (SEC).

The viscosity at 25° C. of the ingredient (A) in the present invention is not particularly limited, but is, for example, 5 Pa·s or more, preferably 50 Pa·s or more, and more preferably 100 Pa·s or more and is, for example, 3000 Pa·s or less, preferably 2500 Pa·s or less, and more preferably 2000 Pa·s or less from the viewpoint of workability and the like. A particularly preferable viscosity is 1550 Pa·s. Note that, unless otherwise specified, the viscosity was measured at 25° C. using a cone-plate type viscometer.

A method of producing the ingredient (A) is not particularly limited, and a known method can be used. Examples of the method include a method of obtaining the ingredient (A) by reacting a terminal hydroxyl group polyisobutylene with acryloyl chloride or methacryloyl chloride, which is disclosed in Polymer Bulletin, Volume 6, pp. 135 to 141 (1981), T. P. Liao and J. P. Kennedy and Polyer Bulletin, Volume 20, pp. 253 to 260 (1988), Puskas et al. In addition, other examples of the method of producing the ingredient (A) include a method of obtaining ingredient (A) by reacting a terminal hydroxyl group polyisobutylene, a (meth)acryloyl group, and a compound having an isocyanate group, a method of obtaining ingredient (A) by reacting a terminal hydroxyl group polyisobutylene, a compound having an isocyanate group, and a compound having a hydroxyl group, a method of obtaining the ingredient (A) by reacting a terminal hydroxyl group polyisobutylene and a (meth)acrylic acid or a (meth)acrylic acid lower ester by use of the dehydration esterification method or the transesterification method, and the like.

In addition, the method of producing the polyisobutylene represented by general formula (1) described above is not particularly limited, and is preferably a method of reacting a halogen-terminated polyisobutylene with a compound having a (meth)acryloyl group and a phenoxy group as represented by the following general formula (2), which is disclosed in Japanese Patent Application Publication No. 2013-216782. Additionally, the halogen-terminated polyisobutylene is obtained by a known method, for example, obtained by cationic polymerization and more preferably obtained by living cationic polymerization.

(2)

In formula (2), $R^2$, $R^3$, $R^4$, and $R^5$ may be as defined in formula (1) described above. Specifically, $R^4$ represents a divalent hydrocarbon group having 2 to 6 carbon atoms and optionally containing an oxygen atom. $R^2$ and $R^3$ each independently represent a hydrogen atom or a monovalent hydrocarbon group having 1 to 20 carbon atoms. $R^5$ represents a hydrogen atom, a methyl group, or an ethyl group. Examples of the compound represented by formula (2) described above include phenoxymethyl (meth)acrylate, phenoxyethyl (meth)acrylate, and phenoxypropyl (meth) acrylate. Phenoxyethyl (meth)acrylate is preferable.

<Ingredient (B)>

An ingredient (B) used in the present invention, namely a photoradical polymerization initiator, is not limited as long as it is a compound which generates a radical or the like that cures the ingredient (A) of the present invention by irradiation with light (active energy rays). Here, the active energy rays include all light in a broad sense, for example radiation such as α-rays and β-rays, electromagnetic waves such as γ-rays and X-rays, electron beams (EB), ultraviolet rays having a wavelength of about 100 to 400 nm, and visible light rays having a wavelength of about 400 to 800 nm. Ultraviolet rays are preferable. Examples of the ingredient (B) include acetophenone-based photoradical polymerization initiators, benzoin-based photoradical polymerization initiators, benzophenone-based photoradical polymerization initiators, thioxanthone-based photoradical polymerization initiators, acylphosphine oxide-based photoradical polymerization initiators, and titanocene-based photoradical polymerization initiators. Among these, the acetophenone-based photoradical polymerization initiators and the acylphosphine oxide-based photoradical polymerization initiators are preferable from the viewpoint that it is possible to obtain a cured product excellent in surface curability and deep curability by irradiation with active energy rays. Additionally, these may be used singly or in combination of two or more kinds.

Examples of the acetophenone-based photoradical polymerization initiators include, but not limited to, diethoxyacetophenone, 2-hydroxy-2-methyl-1-phenyl-propan-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl) butanone, and 2-hydroxy-2-methyl-1-[4-(1-methylvinyl) phenyl]propanone oligomer. Examples of the commercially available products of the acetophenone-based photoradical polymerization initiators include IRGACURE 184, IRGACURE 1173, IRGACURE 2959, IRGACURE 127 (manufactured by BASF), and ESACURE KIP-150 (manufactured by Lamberti s. p. a.).

Examples of the acylphosphine oxide-based photoradical polymerization initiators include, but not limited to, bis(2, 4,6-trimethylbenzoyl)-phenyl-phosphine oxide and 2,4,6-trimethylbenzoyl-diphenyl-phosphine oxide. Examples of the commercially available products of the acylphosphine oxide-based photoradical polymerization initiators include IRGACURE TPO, IRGACURE 819, and IRGACURE 819 DW (manufactured by BASF).

The amount blended of the ingredient (B) of the present invention is, but not particularly limited to, preferably 0.1 to 30 parts by mass, further preferably 0.5 to 20 parts by mass, and particularly preferably 1 to 15 parts by mass relative to 100 parts by mass of the ingredient (A) from the viewpoint that it is possible to achieve both surface curability and deep curability.

<Ingredient (C)>

The ingredient (C) of the present invention is a compound having a radical polymerizable functional group and a cationic polymerizable functional group in one molecule. Note that the ingredient (C) of the present invention is different from the ingredient (A) and the ingredient (D) of the present invention. The ingredient (C) of the present invention provides, in combination with the other components of the present invention, a photocurable resin composition which rapidly cures by irradiation with active energy rays such as ultraviolet rays and is excellent in adhesion to an electrolyte membrane which is a hard-to-bond material. The radical polymerizable functional group is preferably a group having a carbon-carbon unsaturated double bond. It is also possible to use a compound having a (meth)acryloyl group, a vinyl group, or the like which is usually used for adhesives and paints. Among them, the (meth)acryloyl group is preferable from the viewpoint of photocurability. The (meth)acryloyl group includes an acryloyl group and a methacryloyl group. The cationic polymerizable functional group includes a glycidyl group, a vinyl ether group, an oxetane group, and the like. Among them, the glycidyl group and the vinyl ether group are preferable.

Specific examples of the ingredient (C) include glycidyl (meth)acrylate, 2-(2-vinyloxyethoxy) ethyl (meth)acrylate, 4-hydroxybutyl (meth)acrylate glycidyl ether, partially (meth)acrylated bisphenol A type epoxy resins, partially (meth)acrylated bisphenol F type epoxy resins, partially (meth)acrylated novolac epoxy resins, 1,2-epoxy-4-vinylcyclohexane, and the like. Preferable among the above are glycidyl (meth)acrylate, 2-(2-vinyloxyethoxy) ethyl (meth) acrylate, 4-hydroxybutyl (meth)acrylate glycidyl ether, and partially (meth)acrylated bisphenol A type epoxy resins.

Commercially available products of glycidyl (meth)acrylate described above include, but are not limited to, BLEMMER G (manufactured by NOF Corporation) and the like. Examples of commercially available products of 2-(2-vinyloxyethoxy) ethyl (meth)acrylate described above include, but are not limited to, VEEA, VEEM (manufactured by NIPPON SHOKUBAI CO., LTD.), and the like. In addition, commercially available products of 4-hydroxybutyl (meth) acrylate glycidyl ether described above include, but are not limited to, 4HBAGE (manufactured by Nihon Kasei Co., Ltd.) and the like. In addition, commercially available products of the partially (meth)acrylated bisphenol A type epoxy resins described above include, but are not limited to, EA-1010N, EA-1010LC, EA-1010NT (SHIN-NAKAMURA CHEMICAL CO., LTD.), UVACURE 1561 (manufactured by DAICEL-ALLNEX LTD.), and the like. In addition, commercially available products of the partially (meth)acrylated novolac epoxy resins described above include, but are not limited to, ENA, ENC (manufactured by KAGAWA CHEMICAL Co., Ltd.), and the like.

The amount of the ingredient (C) blended is preferably 0.1 to 100 parts by mass, more preferably 0.5 to 50 parts by mass, and particularly preferably 1 to 30 parts by mass relative to 100 parts by mass of the ingredient (A). The above range is preferable because there is no possibility that the surface curability is deteriorated if the ingredient (C) is 0.1 parts by mass or more, and the moisture permeability of the photocurable resin composition does not decrease if the ingredient (C) is 100 parts by mass or less.

<Ingredient (D)>

The present invention may further contain an ingredient (D). The ingredient (D) of the present invention, a (meth) acrylate monomer, is a compound which is polymerized by radical species generated by the ingredient (B) of the present invention, and is used as a reactive diluent. Note that the ingredient (D) of the present invention excludes the ingredient (A) and the ingredient (C) of the present invention. Examples of the ingredient (D) include acrylate monomers and methacrylate monomers, and methacrylate monomers are preferable from the viewpoint of better adhesion to the electrolyte membrane. Moreover, examples of the ingredient (D) usable include monofunctional, bifunctional, trifunctional, and polyfunctional monomers. Among these, (meth) acrylate monomers which have alkyl groups having 5 to 30 carbon atoms or alicyclic groups having 5 to 30 carbon atoms are preferable from the viewpoint of excellent photocurability and compatibility with the ingredient (A) of the present invention. Here, the number of carbon atoms above is, for example, two or more, preferably 3 or more, more preferably 5 or more, and further preferably 7 or more as well as, for example, 30 or less, preferably 20 or less, more preferably 15 or less, and further preferably 10 or less.

Examples of the (meth)acrylate monomers which have alkyl groups having 5 to 30 carbon atoms include, but not particularly limited to, 2-ethylhexyl (meth)acrylate, octyl (meth)acrylate, isooctyl (meth)acrylate, decyl (meth)acrylate, dodecyl (meth)acrylate, isodecyl (meth)acrylate, lauryl (meth)acrylate, n-octadecyl (meth)acrylate, isooctadecyl (meth)acrylate, nonadecane (meth)acrylate, 3-heptyldecyl-1-(meth)acrylate, and stearyl (meth)acrylate. In addition, examples of the (meth)acrylate monomers which have alicyclic groups having 5 to 30 carbon atoms include cyclohexyl (meth)acrylate, trimethylcyclohexyl (meth)acrylate, dicyclopentanyl (meth)acrylate, dicyclopentenyl (meth) acrylate, dicyclopentenyloxy (meth)acrylate, isobornyl (meth)acrylate, adamantyl (meth)acrylate, dicyclopentenyl di(meth)acrylate, and the like. The ingredient (D) may be used singly or as a mixture of two or more kinds.

The amount of this ingredient (D) blended is preferably 3 to 300 parts by mass, more preferably 5 to 200 parts by mass, and particularly preferably 10 to 100 parts by mass relative to 100 parts by mass of the ingredient (A). The above ranges are preferable because there is no possibility that the surface curability is deteriorated if the amount of the ingredient (D) is 3 parts by mass or more, and the moisture permeability of the photocurable resin composition does not decrease if the ingredient (D) is 300 parts by mass or less.

<Optional Ingredient>

It is possible to use additives in the composition of the present invention, such as oligomers having (meth)acryloyl groups (not containing the ingredient (A), the ingredient (C), and the ingredient (D) of the present invention), thermal radical initiators, polythiol compounds, tertiary amine compounds, various kinds of elastomers such as styrene-based copolymers, fillers, preservation stabilizers, antioxidants, light stabilizers, adhesion promoters (not containing the ingredient (C) of the present invention), plasticizers, pigments, flame retardants, and surfactants as long as the object of the present invention is not impaired.

Examples of the oligomers having (meth)acryloyl groups (not containing the ingredient (A), the ingredient (C), and the ingredient (D) of the present invention) include, but not particularly limited to, urethane (meth)acrylates having a polybutadiene skeleton, urethane (meth)acrylates having a hydrogenated polybutadiene skeleton, urethane (meth)acrylates having a polycarbonate skeleton, urethane (meth)acrylates having a polyether skeleton, urethane (meth)acrylates having a polyester skeleton, urethane (meth)acrylates having a castor oil skeleton, isoprene-based (meth)acrylates, hydrogenated isoprene-based (meth)acrylates, epoxy (meth)acrylates, and (meth)acryl group-containing acrylic polymers. Particularly preferable are the urethane (meth)acrylates having a polybutadiene skeleton, the urethane (meth)acrylates having a hydrogenated polybutadiene skeleton, the urethane (meth)acrylates having a castor oil skeleton, the isoprene-based (meth)acrylates, and the hydrogenated isoprene-based (meth)acrylates from the viewpoint of excellent compatibility with the ingredient (A) and the ingredient (D) of the present invention. Note that in the present invention, oligomers refer to compounds which have repeating units of monomers on the main chain and are composed of 2 to 100 repeating units. Additionally, these may be used singly or in combination of two or more kinds.

Examples of the thermal radical initiator include, but not particularly limited to, ketone peroxides, peroxyketals, dialkyl peroxides, hydroperoxides, peroxyesters, diacyl peroxides, and peroxydicarbonate. These compounds may be used singly or mixed in combination of two or more kinds.

Examples of the polythiol compounds include, but not particularly limited to, trimethylolpropane tris(3-mercaptopropionate), pentaerythritol tetrakis(3-mercaptopropionate), trimethylolpropane tris(3-mercaptobutyrate), trimethylolethane tris(3-mercaptobutyrate), trimethylolethane tris(3-mercaptobutyrate), ethylene glycol bis(3-mercaptoglycolate), butanediol bis(3-mercaptoglycolate), trimethylolpropane tris(3-mercaptoglycolate), pentaerythritol tetrakis(3-mercaptoglycolate), tris-[(3-mercaptopropionyloxy)-ethyl]-isocyanurate, pentaerythritol tetrakis(3-mercaptopropionate), tetraethylene glycol bis(3-mercaptopropionate), dipentaerythritol hexakis(3-mercaptopropionate), pentaerythritol tetrakis(3-mercaptobutyrate), 1,4-bis(3-mercaptobutyryloxy)butane, and 1,3,5-tris(3-mercaptobutyloxyethyl)-1,3,5-triazin-2,4,6 (1H, 3H, 5h)-trione. These compounds may be used singly or mixed in combination of two or more kinds.

Examples of the commercially available products of the polythiol compounds include, but not limited to, TMTP and PETP (manufactured by Yodo Kagaku Co., Ltd.), TEMPIC, TMMP, PEMP, PEMP-II-20P, and DPMP (manufactured by SC Organic Chemical Co., Ltd.), and MTNR 1, MTBD 1, and MTPE 1 (manufactured by Showa Denko KK). These compounds may be used singly or mixed in combination of two or more kinds.

The present invention may be blended with tertiary amine compounds for the purpose of improving photocurability. Examples of the tertiary amine compounds include, but not particularly limited to, trimethylamine, triethylamine, tributylamine, N,N'-diethanolamine, N,N'-dimethyl-P-toluidine, N,N'-dimethyl-aniline, N-methyl-diethanolamine, N-methyl-dimethanolamine, N,N'-dimethylamino-acetophenone, N,N'-dimethylaminobenzophenone, N,N'-diethylamino-benzophenone, and triisopropanolamine.

Styrene-based copolymers may be blended in the present invention for the purpose of adjusting the rubber physical property of the cured product. For example, the styrene-based copolymers include, but are not particularly limited to, styrene-butadiene copolymers, styrene-isoprene copolymers (SIP), styrene-butadiene copolymers (SB), styrene-ethylene-butylene-styrene copolymers (SEBS), styrene-isobutylene-styrene copolymers (SIBS), acrylonitrile-styrene copolymers (AS), styrene-butadiene-acrylonitrile copolymers (ABS), and the like.

For the purpose of improving e.g. the elastic modulus and the fluidity of the cured product, fillers may be added to the present invention to an extent that does not impair the storage stability. Specific examples thereof include organic powders, inorganic powders, metallic powders, and the like. Fillers of inorganic powder include glass, fumed silica, alumina, mica, ceramics, silicone rubber powders, calcium carbonate, aluminum nitride, carbon powders, kaolin clay, dried clay minerals, dried diatomaceous earth, and the like. The amount of inorganic powder blended is preferably about 0.1 to 100 parts by mass relative to 100 parts by mass of the ingredient (A). The above range is preferable because sufficient effects can be expected if the amount is 0.1 parts by mass or more, and the fluidity of the photocurable resin composition is not affected or the workability is not reduced if the amount is 100 parts by mass or less.

Fumed silica can be blended for the purpose of adjusting the viscosity of the photocurable resin composition or improving the mechanical strength of the cured product. Preferably, it is possible to use ones hydrophobically treated with organochlorosilanes, polyorganosiloxane, hexamethyldisilazane, or the like. Specific examples of the fumed silica include, for example, commercially available products manufactured by Nippon Aerosil Co., Ltd., such as trade name Aerosil R 974, R 972, R 972 V, R 972 CF, R 805, R 812, R 812 S, R 816, R 8200, RY 200, RX 200, RY 200 S, and R 202.

Fillers of organic powder include, for example, polyethylene, polypropylene, nylon, cross-linked acrylic, cross-linked polystyrene, polyesters, polyvinyl alcohols, polyvinyl butyral, and polycarbonate. The amount of organic powder blended is preferably about 0.1 to 100 parts by mass relative to 100 parts by mass of the ingredient (A). The above range is preferable because sufficient effects can be expected if the amount is 0.1 parts by mass or more, and the fluidity of the photocurable resin composition is not affected or the workability is not reduced if the amount is 100 parts by mass or less.

The present invention may be added with preservation stabilizers. Examples of the preservation stabilizers which can be added include radical absorbers such as benzoquinone, hydroquinone, and hydroquinone monomethyl ether, metal chelating agents such as ethylenediaminetetraacetic acid or 2-sodium salts thereof, oxalic acid, acetylacetone, and o-aminophenol, and the like.

Antioxidants may be added to the present invention. The antioxidant include, for example, quinone-based compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butyl catechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl) ethyl]-4,6-di-tert-pentylphenyl acrylate, 4,4'-butylidenebis(6-tert-butyl-3-methyl phenol), 4,4'-thiobis(6-tert-butyl-3-methyl phenol), 3,9-bis[2-[3-(3-tert-butyl-4-hydroxy-5-methylphenyl) propionyloxy]-1,1-dimethylethyl]-2,4,8,10-tetraoxaspiro [5,5] undecane, pentaerythritol tetrakis[3-(3,5-di-tert-butyl-4-hydroxyphenyl) propionate], thiodiethylene bis[3-(3,5-di-tert-butyl-4-hydroxyphenyl) propionate], octadecyl-3-(3,5-di-tert-butyl-4-hydroxyphenyl) propionate, N,N'-hexane-1,6-diylbis[3-(3,5-di-tert-butyl-4-hydroxyphenyl) propionamide], benzene propanoic acid, 3,5-bis(1,1-dimethylethyl)-4-hydroxy, $C_7$-$C_9$ side chain alkyl ester, 2,4-dimethyl-6-(1-methylpentadecyl) phenol, diethyl [[3,5-bis (1,1-dimethylethyl)-4-hydroxyphenyl] methyl] phosphonate, 3,3', 3", 5,5', 5"-hexa-tert-butyl-a,a',a"-(mesitylene-2,4,6-tolyl) tri-p-cresol, calcium diethyl bis[[3,5-bis (1,1-dimethylethyl)-4-hydroxyphenyl] methyl] phosphonate, 4,6-bis(octylthiomethyl)-o-cresol, ethylenebis (oxyethylene) bis[3-(5-tert-butyl-4-hydroxy-m-tolyl) propionate], hexamethylenebis[3-(3,5-di-tert-butyl-4-hydroxyphenyl) propionate, 1,3,5-tris(3,5-di-tert-butyl-4-hydroxybenzyl)-1,3,5-triazine-2,4,6 (1H,3H,5H)-trione, 1,3,5-tris[(4-tert-butyl-3-hydroxy-2,6-xylyl) methyl]-1,3,5-triazine-2,4,6 (1H,3H,5H)-trione, a reaction product of N-phenylbenzenamine and 2,4,6-trimethylpentene, 2,6-di-tert-butyl-4-(4,6-bis(octylthio)-1,3,5-triazine-2-ylamino) phenol, picric acid, and citric acid; phosphorus-based compounds such as tris(2,4-di-tert-butylphenyl)phosphite, tris [2-[[2,4,8,10-tetra-tert-butyldibenzo[d,f][1,3,2]dioxaphosphefin-6-yl]oxy]ethyl]amine, bis(2,4-di-tert-butylphenyl) pentaerythritol diphosphite, bis[2,4-bis(1,1-dimethylethyl)-6-methylphenyl]ethyl ester phosphorous acid, tetrakis(2,4-di-tert-butylphenyl)[1,1-bisphenyl]-4,4'-diyl bisphosphonite, 6-[3-(3-tert-butyl-4-hydroxy-5-methylphenyl)propoxy]-2,4,8,10-tetra-tert-butyl dibenz[d,f][1,3,2]dioxaphosphefin; sulfur-based compounds such as dilauryl 3,3'-thiodipropionate, dimyristyl 3,3'-thiodipropionate, distearyl 3,3'-thiodipropionate, pentaerythrityl tetrakis(3-lauryl thiopropionate), and 2-mercaptobenzimidazole; amine-based compounds such as phenothiazine; lactone-based compounds; and vitamin E-based compounds. Among these, phenol-based compounds are preferable.

Light stabilizers may be added to the present invention. The light stabilizers include, for example, hindered amine types such as bis(2,2,6,6-tetramethyl-4-piperidyl)sebacate, bis(1,2,2,6,6-pentamethyl-4-piperidyl)sebacate, 4-benzoyloxy-2,2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl-methacrylate, bis(1,2,2,6,6-pentamethyl-4-piperidinyl)[[3,5-bis(1,1-dimethylethyl)-4-hydroxyphenyl]methyl]butyl malonate, decanedioic acid bis(2,2,6,6-tetramethyl-1(octyloxy)-4-piperidinyl)ester, a reaction product of 1,1-dimethylethyl hydroperoxide and octane, N,N',N'',N'''-tetrakis-(4,6-bis-(butyl-(N-methyl-2,2,6,6-tetramethylpiperidine-4-yl) amino)-triazine-2-yl)-4,7-diazadecane-1,10-diamine, a polycondensate of N-(2,2,6,6-tetramethyl-4-piperidyl) butylamine with dibutylamine·1,3,5-triazine.N,N'-bis(2,2,6, 6-tetramethyl-4-piperidyl-1,6-hexamethylene diamine, poly [[6-(1,1,3,3-tetramethylbutyl)amino-1,3,5-triazine-2,4-diyl] [(2,2,6,6-tetramethyl-4-piperidyl)imino]hexamethylene[(2, 2,6,6-tetramethyl-4-piperidyl)imino]], a polymer of dimethyl succinate and 4-hydroxy-2,2,6,6-tetramethyl-1-piperidine ethanol, 2,2,4,4-tetramethyl-20-(β-lauryloxycarbonyl)ethyl-7-oxa-3,20-diazadispiro [5,1,11,2]heneicosan-21-one, β-alanine, N,-(2,2,6,6-tetramethyl-4-piperidinyl)-dodecyl ester/tetradecyl ester, N-acetyl-3-dodecyl-1-(2,2,6, 6-tetramethyl-4-piperidinyl)pyrrolidine-2,5-dione, 2,2,4,4-tetramethyl-7-oxa-3,20-diazadispiro [5,1,11,2] hencicosan-21-one, 2,2,4,4-tetramethyl-21-oxa-3,20-diazacyclo-[5,1, 11,2]-heneicosan-20-propanoic acid dodecyl ester/ tetradecyl ester, propanedioic acid, [(4-methoxyphenyl)-methylene]-bis(1,2,2,6,6-pentamethyl-4-piperidinyl)ester, higher fatty acid esters of 2,2,6,6-tetramethyl-4-piperidinol, 1,3-benzenedicarboxamide, N,N'-bis(2,2,6,6-tetramethyl-4-piperidinyl); benzophenone-based compounds such as octabenzone; benzotriazole-based compounds such as 2-(2H-benzotriazole-2-yl)-4-(1,1,3,3-tetramethylbutyl)phenol, 2-(2-hydroxy-5-methylphenyl)benzotriazole, 2-[2-hydroxy-3-(3,4,5,6-tetrahydrophthalimide-methyl)-5-methylphenyl]benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazole-2-yl)-5-tert-butyl-4-hydroxyphenyl)propionate and polyethylene glycol, 2-(2H-benzotriazole-2-yl)-6-dodecyl-4-methyl phenol; benzoate-based compounds such as 2,4-di-tert-butylphenyl-3,5-di-tert-butyl-4-hydroxybenzoate; and triazine-based compounds such as 2-(4,6-diphenyl-1,3,5-triazine-2-yl)-5-[(hexyl)oxy]phenol. Hindered amine-based compounds are particularly preferable.

Adhesion promoters may be added to the present invention. Examples of the adhesion promoters include 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, methacryloxyoctyl trimethoxysilanc, vinyl trimethoxysilane, vinyl trichlorosilane, vinyl triethoxysilane, vinyltris(β-methoxyethoxy)silane, γ-chloropropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, hydroxyethyl methacrylate phosphate ester, methacryloxyoxyethyl acid phosphate, methacryloxyoxyethyl acid phosphate monoethylamine half salt, 2-hydroxyethyl methacrylic acid phosphate, and the like. Preferable among these are hydroxyethyl methacrylate phosphate ester, methacryloxyoxyethyl acid phosphate, methacryloxyoxyethyl acid phosphate monoethylamine half salt, 2-hydroxyethyl methacrylic acid phosphate, and the like. The content of the adhesion promoter is preferably 0.05 to 30 parts by mass and further preferably 0.2 to 10 parts by mass relative to 100 parts by mass of the ingredient (A).

Plasticizers, pigments, flame retardants, and surfactants may be added to the present invention. The plasticizers include, for example, petroleum-based process oils such as paraffinic process oils, naphthenic process oils, and aromatic process oils, acrylic plasticizers, dibasic acid dialkyls such as diethyl phthalate, dioctyl phthalate, and dibutyl adipate, low molecular weight liquid polymers such as liquid polybutene and liquid polyisoprene, and the like. The pigments include, for example, carbon and the like. The flame retardants include, for example, hydrated metal compound types, phosphorus types, silicone types, nitrogen compound types, and the like. The surfactants include, for example, anionic surfactants, nonionic surfactants, non-ionic surfactants, and the like. These may be used singly or in combination of two or more kinds.

The photocurable resin composition of the present invention can be produced by a conventionally known method. It is possible to produce the photocurable resin composition by, for example, blending predetermined amounts of the ingredient (A) to the ingredient (C) as well as other optional ingredients, followed by mixing at a temperature of preferably 10 to 70° C. for preferably 0.1 to 5 hours using a mixing means such as a mixer. In addition, it is preferable to carry out production in a light-shielding environment.

<Application Method>

As a method for applying the photocurable resin composition of the present invention to an adherend, a publicly known method for a sealing agent or an adhesive is used. For example, it is possible to use methods such as dispensing using an automatic coater, spraying, inkjet, screen printing, gravure printing, dipping, and spin coating. The photocurable resin composition of the present invention is preferably liquid at 25° C. from the viewpoint of easiness in application.

<Curing Method>

The photocurable resin composition of the present invention can be cured by irradiation with light such as ultraviolet rays, visible light, and active energy rays. The light mentioned here means light in a broad sense including various active energy rays such as radiation such as α-ray and β-ray, electromagnetic wave such as γ-ray and X-ray, electron beam (EB), ultraviolet ray of about 100 to 400 nm, and visible light of about 400 to 800 nm. The light source used for curing is not particularly limited, and examples thereof include low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like. The irradiation dose of light irradiation is preferably 10 kJ/m$^2$ or more and more preferably 15 kJ/m$^2$ or more from the viewpoint of the properties of a cured product.

<Cured Product>

A cured product of the present invention can be obtained by curing the photocurable resin composition of the present invention in the foregoing curing method by irradiation with light such as ultraviolet rays (active energy rays). A cured product of the present invention may be any product obtained by curing the photocurable resin composition of the present invention regardless of a curing method employed.

<Usage and Sealing Agent>

Preferable use of the photocurable resin composition of the present invention or a cured product thereof is a photocurable sealing agent. In the present invention, the sealing agent includes usages such as an adhesive, a coating agent, an injecting agent, a potting agent, and the like. Note that for use in such usages, the photocurable resin composition of the present invention is preferably liquid at 25° C.

Since the photocurable resin composition of the present invention or a cured product thereof is a rubber elastic body being excellent in low gas permeability, low moisture permeability, heat resistance, acid resistance, and flexibility, specific usages of the sealing agents include stacked bodies for fuel cells, solar cells, dye-sensitized solar cells, lithium ion batteries, electrolytic capacitors, liquid crystal displays, organic EL displays, electronic paper, LEDs, hard disk devices, photodiodes, optical communication/circuits, electric wires/cables/optical fibers, optical isolators, IC cards, and the like; sensors; substrates; pharmaceutical and medical instruments and equipment; and the like. Among these usages, the usage as fuel cells is particularly preferable because the photocurable resin composition of the present invention is rapidly cured by irradiation with active energy rays such as ultraviolet rays, and is excellent in adhesion to an electrolyte membrane which is a poorly adhesive material, hydrogen gas barrier property, and water vapor barrier property.

<Fuel Cell>

The fuel cell is a power generator that extracts electric power by chemically reacting hydrogen with oxygen. Here, as for fuel cells, there are four types including a solid polymer fuel cell, a phosphoric acid fuel cell, a molten carbonate fuel cell, and a solid oxide fuel cell. Among them, the solid polymer fuel cell achieves high power generation efficiency while having a relatively low operating temperature (around 80° C.), and therefore is used for applications such as power sources for automobiles, power generators for households, small power source for electronic equipment such as a mobile phone, and power sources for emergency.

Figure 2:
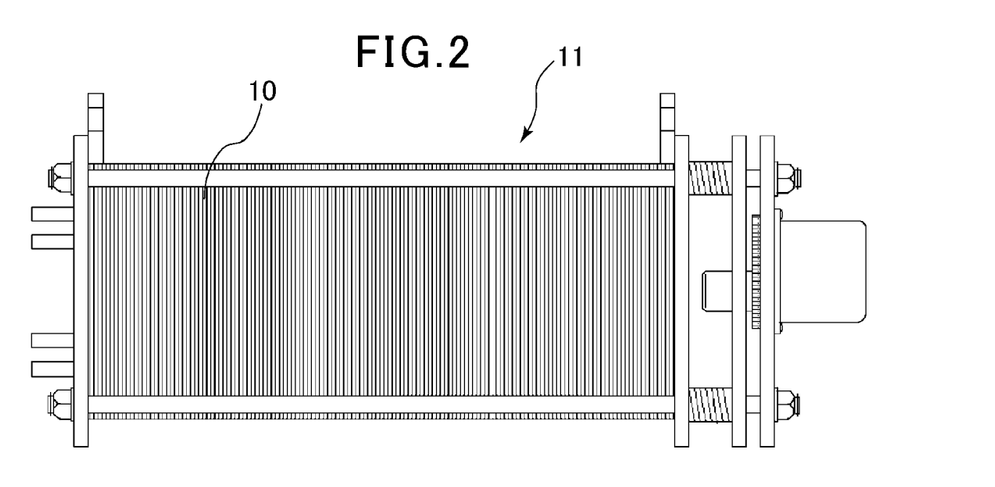
FIG. 2 is a schematic diagram illustrating the entire fuel cell.

As illustrated in FIG. 1, the cell 1 of the typical solid polymer fuel cell has the structure including: the electrolyte membrane electrode assembly 5 (MEA) structured such that the polymer electrolyte membrane 4 is nipped between the air electrode 3a and the fuel electrode 3b; the frame 6 supporting the MEA; and the separators 2 in which the gas flow paths are formed. In order to activate the solid polymer fuel cell, a fuel gas (hydrogen gas) and an oxidation gas (oxygen gas) are supplied through an oxidation gas flow path 8a and a fuel gas flow path 8b. Moreover, for the purpose of suppressing heat generation during power generation, cooling water flows through a flow path 9. Note that a package including several hundreds of such cells stacked on one another is referred to as a cell stack 10 as illustrated in FIG. 2.

When the fuel gas (hydrogen gas) is supplied to the fuel electrode and the oxidation gas (oxygen gas) is supplied to the oxygen electrode (air electrode), the following reactions occur at the respective electrodes, and a reaction to generate water ($H_2 + \frac{1}{2}O_2 \rightarrow H_2O$) occurs as a whole. To be more specific, protons ($H^+$) generated at the fuel electrode as described below are diffused inside the solid polymer membrane to move to the oxygen electrode side, and water ($H_2O$) generated by reaction with the oxygen is discharged from the oxygen electrode side.

Fuel electrode (anode electrode): $H_2 \rightarrow 2H^+ + 2e^-$

Oxygen electrode (cathode electrode): $\frac{1}{2}O_2 + 2H^+ + 2e^- \rightarrow H_2O$ In order to activate the solid polymer fuel cell, it is necessary to supply the anode electrode with the fuel gas containing hydrogen and supply the cathode electrode with the oxidation gas containing oxygen in such a separated manner that these gases can be isolated from each other. This is because there is a risk of lowering the power generation efficiency, if one of the gases is mixed with the other gas due to insufficiency of the isolation. Against such a background, a sealing agent is used in many portions for the purpose of preventing leakage of the fuel gas, the oxygen gas, and the like. Specifically, the sealing agent is used between adjacent separators, between a separator and a frame, between a frame and an electrolyte membrane or MEA, and so on.

As the polymer electrolyte membrane, there is a cation exchange membrane having ion conductivity, and a preferable one is made of a fluorine-based polymer having a sulfonic acid group or the like, because it is chemically stable and has high resistance under high-temperature operation. There are commercially available products such as Nafion (registered trademark) manufactured by DuPont, Flemion (registered trademark) manufactured by Asahi Kasei Corporation, Aciplex (registered trademark) manufactured by Asahi Glass Co., Ltd., and the like. Although a polymer electrolyte membrane generally has properties difficult to bond, use of the photocurable resin composition of the present invention makes it possible to bond the polymer electrolyte membrane.

Nafion (Registered Trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which functions to diffuse the gas or to moisturize the electrolyte. As the gas diffusion layer, a known layer is used, and examples thereof include carbon paper, carbon cloth, carbon fiber, and the like.

As illustrated in FIG. 1, each of the separators 2 is provided with finely-ribbed flow paths, through each of which a fuel gas or an oxidizing gas is supplied to the corresponding electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. As a material for the frame, there are thermoplastic resins such as polyvinyl chloride, polyethylene naphthalate, polyethylene terephthalate, polypropylene, and polycarbonate. In addition, in order to bond members using the photocurable resin composition of the present invention or a cured product thereof, it is preferable that the members be transmissive of light.

The fuel cell of the present invention is characterized in that sealing is provided by the photocurable resin composition of the present invention or a cured product thereof. The members needed to be sealed in the fuel cell are the separators, the frame, the electrolyte, the fuel electrode, the air electrode, the MEA, and so on. More specifically, sealing is provided between the adjacent separators, between the separator and the frame, between the frame and the electrolyte membrane or MEA, and the like. Here, the main purpose of "sealing between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path. Note that since the atmosphere becomes strongly acidic due to the acid generated from the electrolyte membrane, acid resistance is required for the sealing agent.

<Sealing Method>

A sealing method using the photocurable resin composition of the present invention is not particularly limited, and typical methods are FIPG (Form-in-Place Gasket), CIPG (Cure-in-Place Gasket), MIPG (Mold-in-Place Gasket), liquid injection molding, and the like.

FIPG is a method involving: applying the photocurable resin composition of the present invention to a flange of a seal target component with an automatic coater or the like;

and, with the flange stuck on another flange, irradiating the photocurable resin composition with active energy rays such as ultraviolet rays from the light-transmissive flange side and thus curing the photocurable resin composition to thereby carry out adhesive sealing. More specifically, the method is a method for sealing at least part of at least two flanges of seal target components including the at least two flanges, at least one of which is light-transmissive, allowing active energy rays to pass therethrough, the method comprising the steps of: applying the photocurable resin composition described above to a surface of at least one of the flanges; sticking the one flange with the photocurable resin composition applied thereto onto the other flange with the photocurable resin composition interposed in between; and sealing the at least part between the at least two flanges by curing the photocurable resin composition by irradiation with active energy rays through the light-transmissive flange.

CIPG is a method involving: applying the photocurable resin composition of the present invention in the form of a bead to a flange of a seal target component with an automatic coater or the like; irradiating the photocurable resin composition with active energy rays such as ultraviolet rays and thus curing the photocurable resin composition to form a gasket; and performing compression sealing with the flange stuck on another flange. More specifically, the method is a method for sealing at least part of at least two flanges of seal target components including the at least two flanges, comprising the steps of: applying the photocurable resin composition described above at least one of the flanges; irradiating the applied photocurable resin composition with active energy rays to cure the photocurable resin composition, thereby forming a gasket composed of a cured product of the photocurable resin composition; and placing the other flange on the gasket, and sealing the at least part of the at least two flanges in such a way that the other flange and the one flange with the photocurable resin composition applied thereto are pressure bonded together with the gasket interposed in between.

MIPG is a method involving: placing a mold in pressure contact with a flange of a seal target component in advance; injecting the photocurable resin composition into a cavity formed between the flange and the mold made of a light-transmissive material; irradiating the photocurable resin composition with active energy rays such as ultraviolet rays for photocuring to form a gasket; and performing compression sealing with the flange stuck on the other flange. Here, the mold is preferably made of a material allowing passage of light, which is specifically glass, polymethylmethacrylate (PMMA), polycarbonate, cycloolefin polymer, olefin, or the like. In addition, for easy demolding of the gasket from the mold after the formation of the gasket, it is preferable to apply a release agent such as a fluorine-based agent or a silicone-based agent. More specifically, the method is a method for sealing at least part of at least two flanges of seal target components including the at least two flanges, comprising the steps of: placing a gasket formation mold on at least one of the flanges; injecting the photocurable resin composition described above into at least part of a cavity formed between the gasket formation mold and the flange on which the mold is placed; irradiating the photocurable resin composition with the active energy rays to cure the photocurable resin composition, thereby forming a gasket composed of a cured product of the photocurable resin composition; detaching the mold from the one flange; and sealing the at least part of the at least two flanges by placing the other flange on the gasket and then pressure bonding the one and the other flanges together with the gasket interposed in between.

The liquid injection molding is a method involving: forming a gasket by injecting the photocurable resin composition of the present invention with a predetermined pressure into a mold made of a material allowing passage of light, and photocuring the photocurable resin composition by irradiation with active energy rays such as ultraviolet rays; and performing compression sealing with the flange stuck on the other flange. Here, the mold is preferably made of a material allowing passage of light, which is specifically glass, PMMA, polycarbonate, cycloolefin polymer, olefin, or the like. In addition, for easy demolding of the gasket from the mold after the formation of the gasket, it is preferable to apply a release agent such as a fluorine-based agent, a silicone-based agent, or the like.

EXAMPLES

Hereinafter, the present invention is described in further details by taking Examples, but the present invention should not be limited to these Examples.

<Production of a1>

Production of Polyisobutylene Having Acryloyloxyethoxyphenyl Groups (a1)

After replacing the inside of a 5 L separable flask with nitrogen, 200 mL of n-hexane and 2000 mL of butyl chloride were added, and the mixture was cooled to −70° C. with stirring under a nitrogen atmosphere. Subsequently, 840 mL (9 mol) of isobutylene, 12 g (0.05 mol) of p-dicumyl chloride, and 1.1 g (0.012 mol) of 2-methylpyridine were added. After the reaction mixture was cooled to −70° C., 5.0 mL (0.05 mol) of titanium tetrachloride was added to initiate polymerization. Three hours after the initiation of polymerization, 40 g of phenoxyethyl acrylate (Light Acrylate PO-A, manufactured by Kyoeisha Chemical Co., Ltd.) and 110 ml of titanium tetrachloride were added. After that, stirring was continued at −70° C. for 4 hours, and then 1000 ml of methanol was added to stop the reaction.

The supernatant was separated from the reaction solution, and the solvent and the like were distilled off. Then, the product was dissolved in 3000 ml of n-hexane, washed three times with 3000 ml of pure water, and reprecipitated from methanol. After that, the solvent was distilled off under reduced pressure, and the obtained polymer was vacuum-dried at 80° C. for 24 hours to obtain polyisobutylene having acryloyloxyethoxyphenyl groups (a1).

The a1 contains the —[$CH_2C(CH_3)_2$]— unit and contains two acryloyl groups. More specifically, a1 is polyisobutylene where, in general formula (3), $R^1$ represents a phenylene group, PIB represents a polyisobutylene skeleton, $R^4$ represents a hydrocarbon group having two carbon atoms, $R^2$ and $R^3$ each independently represent a hydrogen atom, $R^5$ represents a hydrogen atom, and n is 2.

Note that the number average molecular weight of the ingredient a1 (chromatographic method, in terms of polystyrene) was 11,100, and the viscosity (25° C.) of the ingredient a1 was 1550 Pa·s.

(3)

Preparation of Photocurable Resin Composition

Example 1

The polyisobutylene (a1) having acryloyloxyethoxyphenyl groups as the ingredient (A) of the present invention at 100 parts by mass, 2-hydroxy-2-methyl-1-phenyl-propan-1-one (IRGACURE 1173, manufactured by BASF) as the ingredient (B) at 3 parts by mass, 4-hydroxybutyl acrylate glycidyl ether (4HBAGE, manufactured by Nihon Kasei Co., Ltd.) as the ingredient (C) at 3 parts by mass, and isobornyl methacrylate (SR423, manufactured by Sartomer) as the ingredient (D) at 50 parts by mass were added and mixed for 60 minutes with a planetary mixer at room temperature (25° C.) under light shielding to obtain a photocurable resin composition of Example 1.

Example 2

Example 2 was obtained by the same preparation as Example 1 except that, in Example 1, glycidyl methacrylate (BLEMMER G, manufactured by NOF CORPORATION) was used as the ingredient (C) instead of 4-hydroxybutyl acrylate glycidyl ether.

Example 3

Example 3 was obtained by the same preparation as Example 1 except that, in Example 1, 2-(2-vinyloxyethoxy) ethyl acrylate (VEEA, manufactured by Nippon Shokubai Co., Ltd.) was used as the ingredient (C) instead of 4-hydroxybutyl acrylate glycidyl ether.

Example 4

Example 4 was obtained by the same preparation as Example 1 except that, in Example 1, a partially acrylated bisphenol A type epoxy resin (UVACURE 1561, manufactured by DAICEL-ALLNEX LTD.) was used as the ingredient (C) instead of 4-hydroxybutyl acrylate glycidyl ether.

Example 5

Example 5 was obtained by the same preparation as Example 1 except that, in Example 1, dicyclopentanyl methacrylate (FA-513M, manufactured by Hitachi Chemical Company, Ltd.) was used as the ingredient (D) instead of isobornyl methacrylate.

Example 6

Example 6 was obtained by the same preparation as Example 1 except that, in Example 1, 4-hydroxybutyl acrylate glycidyl ether was changed in amount to 6 parts by mass.

Example 7

Example 7 was obtained by the same preparation as Example 1 except that, in Example 1, 4-hydroxybutyl acrylate glycidyl ether was changed in amount to 10 parts by mass.

Comparative Example 1

Comparative Example 1 was obtained by the same preparation as Example 1 except that, in Example 1, 4-hydroxybutyl acrylate glycidyl ether was removed.

Comparative Example 2

Comparative Example 2 was obtained by the same preparation as Example 1 except that, in Example 1, 4-hydroxybutyl acrylate (4HBA, manufactured by Nihon Kasci Co., Ltd.) was used instead of 4-hydroxybutyl acrylate glycidyl ether.

Comparative Example 3

Comparative Example 3 was obtained by the same preparation as Example 1 except that, in Example 1, 2-phenoxyethyl acrylate (SR-339A, manufactured by Sartomer) was used instead of 4-hydroxybutyl acrylate glycidyl ether.

Comparative Example 4

Comparative Example 4 was obtained by the same preparation as Example 1 except that, in Example 1, acrylic acid (reagent) was used instead of 4-hydroxybutyl acrylate glycidyl ether.

Comparative Example 5

Comparative Example 5 was obtained by the same preparation as Example 1 except that, in Example 1, 3-glycidoxypropyltriethoxysilane (KBM-403, manufactured by Shin-Etsu Chemical Co., Ltd.) was used instead of 4-hydroxybutyl acrylate glycidyl ether.

Comparative Example 6

Comparative Example 6 was obtained by the same preparation as Example 1 except that, in Example 1, a bisphenol A type liquid epoxy resin having no radical polymerizable functional group (EXA-850CRP, manufactured by DIC Corporation) was used instead of 4-hydroxybutyl acrylate glycidyl ether.

Comparative Example 7

Comparative Example 7 was obtained by the same preparation as Example 1 except that, in Example 1, 3',4'-epoxycyclohexylmethyl 3,4-epoxycyclohexanecarboxylate (Celloxide 2021P, manufactured by Daicel Corporation) was used instead of 4-hydroxybutyl acrylate glycidyl ether.

The test methods used in Examples and Comparative Examples in Table 1 are as follows.
<Adhesion Test for Electrolyte Membrane>

The photocurable resin composition was applied to a polypropylene (PP) film to a thickness of 50 μm, and the resultant was bonded to an electrolyte membrane of fluorine-based polymer having sulfonic acid groups (Nafion manufactured by DuPont), followed by irradiation with ultraviolet rays from the PP film side for 20 seconds with an irradiation dose of 45 kJ/m$^2$ for curing to form a test piece. Next, the cured product of the photocurable resin composition together with the PP film was peeled off from the electrolyte membrane in the direction of 180 degrees at a rate of 10 mm/min using a tensile tester. The adhesion interface was observed and evaluated based on the following criteria.
[Evaluation Criteria]
Good: electrolyte membrane was broken
Poor: CF (cohesive failure) occurred, no AF (interfacial failure from PP film or
electrolyte membrane) occurred
Bad: AF (interfacial failure from PP film or electrolyte membrane) occurred

TABLE 1

|  | Adhesion to Electrolyte Membrane |
| --- | --- |
| Example 1 | Good |
| Example 2 | Good |
| Example 3 | Good |
| Example 4 | Good |
| Example 5 | Good |
| Example 6 | Good |
| Example 7 | Good |
| Comparative Example 1 | Bad |
| Comparative Example 2 | Poor |
| Comparative Example 3 | Bad |
| Comparative Example 4 | Bad |
| Comparative Example 5 | Bad |
| Comparative Example 6 | Bad |
| Comparative Example 7 | Bad |

Examples 1 to 7 of Table 1 reveal that the present invention rapidly cures (about 20 seconds) by irradiation with active energy rays such as ultraviolet rays and is excellent in adhesion to an electrolyte membrane which is a hard-to-bond material.

In addition, it is found that Comparative Example 1 of Table 1 is a composition which does not contain the ingredient (C) of the present invention, and is inferior in adhesion to an electrolyte membrane. It is found that Comparative Example 2 is a composition using 4-hydroxybutyl acrylate instead of the ingredient (C) of the present invention, and is inferior in adhesion to an electrolyte membrane. It is found that Comparative Example 3 is a composition using 2-phenoxyethyl acrylate instead of the ingredient (C) of the present invention, and is inferior in adhesion to an electrolyte membrane. It is found that Comparative Example 4 is a composition using acrylic acid instead of the ingredient (C) of the present invention, and is inferior in adhesion to an electrolyte membrane. It is found that Comparative Example 5 is a composition using 3-glycidoxypropyltriethoxysilane instead of the ingredient (C) of the present invention, and is inferior in adhesion to an electrolyte membrane. It is found that Comparative Example 6 is a composition using a bisphenol A type epoxy resin having no radical polymerizable functional group instead of the ingredient (C) of the present invention, and is inferior in adhesion to an electrolyte membrane. It is found that Comparative Example 7 is a composition using 3',4'-epoxycyclohexylmethyl 3,4-epoxycyclohexanecarboxylate instead of the ingredient (C) of the present invention, and is inferior in adhesion to an electrolyte membrane.

Moreover, tests for moisture permeability (water vapor barrier property) and hydrogen gas barrier property were carried out. Comparative Examples 8 and 9 used compositions prepared as follows.

Comparative Example 8

Comparative Example 8 was obtained by the same preparation as Example 1 except that, in Example 1, urethane dimethacrylate having a polybutadiene skeleton (TE-2000, manufacture by NIPPON SODA CO., LTD.) was used instead of the ingredient (A).

Comparative Example 9

Comparative Example 9 was obtained by the same preparation as Example 1 except that, in Example 1, urethane diacrylate having a polyether skeleton (UXF-4002, manufactured by Nippon Kayaku Co., Ltd.) was used instead of the ingredient (A).
<Moisture Permeability (Water Vapor Barrier Property)>

Each of the photocurable resin compositions of Examples 1 and 2 and Comparative Examples 6, 8, and 9 was poured into a frame of 200 mm×200 mm×1.0 mm. Then, a sheet-shaped cured product having a thickness of 1.0 mm was prepared by irradiation with ultraviolet rays for 20 seconds using an ultraviolet ray irradiator to obtain an accumulated light amount of 45 kJ/m$^2$. In an aluminum cup having an opening with a diameter of 30 mm, 5 g of calcium chloride (anhydrous) was placed, and the cured product was set in the cup. After measuring the "initial total mass" (g), the cured product was allowed to stand for 24 hours in a thermo-hygrostat kept at an ambient temperature of 40° C. and a relative humidity of 95%. Thereafter, the "total mass after standing" (g) was measured, and the moisture permeability (g/m$^2$·24 h) was calculated. Evaluation was carried out based on the following evaluation criteria. The results are shown in Table 2. The detailed test method is in accordance with JIS Z 0208. Note that the moisture permeability is preferably less than 50 g/m$^2$·24 h in the case of use as a photocurable sealing agent for a fuel cell.
[Evaluation Criteria]
Favorable: The moisture permeability is less than 10 g/m$^2$·24 h
good: The moisture permeability is 10 g/m$^2$·24 h or more and less than 50 g/m$^2$·24 h
Unfavorable: The moisture permeability is 50 g/m$^2$·24 h or more
<Hydrogen Gas Barrier Property>

Each of the photocurable resin compositions of Examples 1 and 2 and Comparative Examples 6, 8, and 9 was used to prepare a sheet-shaped cured product having a thickness of 1.0 mm by irradiation with ultraviolet rays for 20 seconds using an ultraviolet ray irradiator to obtain an accumulated light amount of 45 kJ/m$^2$. Next, the sheet-shaped cured product was used to carry out measurement in accordance with JIS K 7126-1: 2006 (Plastic-Film and Sheet-Gas Permeability Test Method—Part 1: Differential Pressure Method). Note that the test type was the pressure sensor method, and the measurement was conducted under the conditions of 23° C. and the high pressure side test gas (hydrogen gas) having 100 kPa. Evaluation was carried out based on the following evaluation criteria. The results are shown in Table 2. Note that the hydrogen gas barrier property is preferably less than $1\times10^{-15}$ mol·m/m$^2$·s·Pa in the case of use as a photocurable sealing agent for a fuel cell.
[Evaluation Criteria]
Favorable: less than $1\times10^{-15}$ mol·m/m$^2$·s·Pa
Unfavorable: $1\times10^{-15}$ mol·m/m$^2$·s·Pa or more

TABLE 2

|  | Example 1 | Example 2 | Comparative Example 6 | Comparative Example 8 | Comparative Example 9 |
| --- | --- | --- | --- | --- | --- |
| Moisture Permeability | Favorable | Favorable | Good | Good | Unfavorable |

TABLE 2-continued

|  | Example 1 | Example 2 | Comparative Example 6 | Comparative Example 8 | Comparative Example 9 |
|---|---|---|---|---|---|
| Hydrogen Gas Barrier Properly | Favorable | Favorable | Unfavorable | Unfavorable | Unfavorable |

Examples 1 and 2 of Table 2 show that the present invention is low in moisture permeability and excellent in hydrogen gas barrier property, and has good sealability. On the other hand, Comparative Example 6 was a composition using a bisphenol A type epoxy resin having no radical polymerizable functional group instead of the ingredient (C) of the present invention, and showed a result that the hydrogen gas barrier property was inferior. The results for Comparative Example 8, which used a urethane dimethacrylate having a polybutadiene skeleton instead of the ingredient (A), were such that the hydrogen gas barrier property was inferior. In addition, the results for Comparative Example 9, which used a urethane dimethacrylate having a polyether skeleton instead of the ingredient (A), were such that the moisture permeability and the hydrogen gas barrier property were inferior.

INDUSTRIAL APPLICABILITY

The present invention rapidly cures by irradiation with active energy rays such as ultraviolet rays and is excellent in adhesion to an electrolyte membrane which is a hard-to-bond material, hydrogen gas barrier property, and water vapor barrier property, and therefore can be used for various sealing applications. The present invention is industrially useful because it is effective particularly as a photocurable sealing agent for a fuel cell.

REFERENCE SIGNS LIST

1 cell of solid polymer fuel cell
2 separator
3a air electrode (cathode)
3b fuel electrode (anode)
4 polymer electrolyte membrane
5 electrolyte membrane electrode assembly (MEA)
6 frame
7 adhesive or sealing agent
8a oxidizing gas flow path
8b fuel gas flow path
9 cooling water flow path
10 cell stack
11 solid polymer fuel cell

What is claimed is:

1. A photocurable resin composition comprising the following ingredients (A) to (D):
   ingredient (A): a polymer having one or more (meth)acryloyl groups and having a polyisobutylene skeleton containing a —[CH$_2$C(CH$_3$)$_2$]— unit,
   ingredient (B): a photoradical polymerization initiator,
   ingredient (C): a compound having a radical polymerizable functional group and a cationic polymerizable functional group in one molecule in which the compound is at least one selected from the group consisting of 2-(2-vinyloxyethoxy) ethyl acrylate, partially acrylated bisphenol A type epoxy resins, partially acrylated bisphenol F type epoxy resins, partially acrylated novolac epoxy resins, and 1,2-epoxy-4-vinylcyclohexane, and
   ingredient (D): a (meth)acrylate monomer which has an alkyl group having 5 to 30 carbon atoms or an alicyclic group having 5 to 30 carbon atoms with proviso that the ingredient (D) is different from the ingredient (A) and the ingredient (C);
   wherein the ingredient (C) is contained at 0.1 to 100 parts by mass and the ingredient (D) is contained at 3 to 300 parts by mass, relative to 100 parts by mass of the ingredient (A).

2. The photocurable resin composition according to claim 1, wherein the ingredient (C) is a contained at 0.5 to 50 parts by mass relative to 100 parts by mass of the ingredient (A).

3. The photocurable resin composition according to claim 1, wherein the ingredient (A) is a polymer having a polyisobutylene skeleton represented by general formula (1):

$$\left[ R^1 \!-\! PIB \!-\! \underset{R^3}{\overset{R^2}{\diagdown}}\!\!\!\!\bigcirc\!\!\!\!\diagup \!-\! O \!-\! R^4 \!-\! O \!-\! \underset{}{\overset{O}{\|}} C \!-\! \underset{R^5}{C} \!=\! CH_2 \right]_n \quad (1)$$

where $R^1$ represents a monovalent or polyvalent aromatic hydrocarbon group, or a monovalent or polyvalent aliphatic hydrocarbon group, PIB represents the polyisobutylene skeleton containing the —[CH$_2$C(CH$_3$)$_2$]— unit, $R^4$ represents a divalent hydrocarbon group having 2 to 6 carbon atoms and optionally containing an oxygen atom, $R^2$ and $R^3$ each independently represent a hydrogen atom or a monovalent hydrocarbon group having 1 to 20 carbon atoms, $R^5$ represents a hydrogen atom, a methyl group, or an ethyl group, and n is an integer from 1 to 6.

4. The photocurable resin composition according to claim 1, wherein the ingredient (D) is at least one selected from the group consisting of 2-ethylhexyl (meth)acrylate, octyl (meth)acrylate, isooctyl (meth)acrylate, decyl (meth)acrylate, dodecyl (meth)acrylate, isodecyl (meth)acrylate, lauryl (meth)acrylate, n-octadecyl (meth)acrylate, isooctadecyl (meth)acrylate, nonadecane (meth)acrylate, 3-heptyldecyl-1-(meth)acrylate, stearyl (meth)acrylate, cyclohexyl (meth)acrylate, trimethylcyclohexyl (meth)acrylate, dicyclopentanyl (meth)acrylate, dicyclopentenyl (meth)acrylate, dicyclopentenyloxy (meth)acrylate, isobornyl (meth)acrylate, adamantyl (meth)acrylate, and dicyclopentenyl di(meth)acrylate.

5. The photocurable resin composition according claim 1, wherein the ingredient (C) is contained at 3 to 10 parts by mass relative to 100 parts by mass of the ingredient (A).

6. A photocurable sealing agent for a fuel cell comprising the photocurable resin composition according to claim 1.

7. The photocurable sealing agent for a fuel cell according to claim 6, wherein the photocurable sealing agent for a fuel cell is a photocurable sealing agent for a fuel cell for a periphery of any member selected from the group consisting of separators, frames, electrolytes, fuel electrodes, air electrodes, and electrolyte membrane electrode assemblies, which are members in a fuel cell.

8. The photocurable sealing agent for a fuel cell according to claim 6, wherein the photocurable sealing agent for a fuel cell is a sealing agent between adjacent separators in a fuel cell or a sealing agent between a frame and an electrolyte membrane or an electrolyte membrane electrode assembly in the fuel cell.

9. The photocurable sealing agent for a fuel cell according to claim 6, wherein the fuel cell is a solid polymer fuel cell.

10. A cured product which is formed by photocuring the sealing agent according to claim 6.

11. A cured product which is formed by photocuring the photocurable resin composition according to claim 1.

12. A fuel cell comprising any seal selected from the group consisting of a seal between adjacent separators in the fuel cell and a seal between a frame and an electrolyte membrane or an electrolyte membrane electrode assembly in the fuel cell, wherein
the any seal contains the cured product according to claim 11.

13. The fuel cell according to claim 12, wherein the fuel cell is a solid polymer fuel cell.

14. A method for sealing at least part of at least two peripheral areas of seal target components including the at least two peripheral areas, at least one of which is light-transmissive, allowing active energy rays to pass therethrough, the method comprising the steps of:
applying the photocurable resin composition according to claim 1 to a surface of at least one of the at least two peripheral areas;
sticking the at least one of the at least two peripheral areas with the photocurable resin composition applied thereto onto another of the at least two peripheral areas with the photocurable resin composition interposed in between; and
sealing at least part of the at least two peripheral areas by curing the photocurable resin composition by irradiation with active energy rays through the light-transmissive peripheral area.

15. A method for sealing at least part of at least two peripheral areas of seal target components including the at least two peripheral areas, comprising the steps of:
applying the photocurable resin composition according to claim 1 to at least one of the peripheral areas;
irradiating the applied photocurable resin composition with active energy rays to cure the photocurable resin composition, thereby forming a gasket composed of a cured product of the photocurable resin composition; and
sealing at least part of the at least two peripheral areas by placing another of the at least two peripheral areas on the gasket and pressure bonding the another of the at least two peripheral areas and the one of the at least two peripheral areas, to which the photocurable resin composition is applied, together with the gasket interposed in between.

16. A method for sealing at least part of at least two peripheral areas of seal target components including the at least two peripheral areas, comprising the steps of:
placing a gasket formation mold on at least one of the peripheral areas;
injecting the photocurable resin composition according to claim 1 into at least part of a cavity formed between the gasket formation mold and the at least one of the peripheral areas on which the mold is placed;
irradiating the photocurable resin composition with the active energy rays to cure the photocurable resin composition, thereby forming a gasket composed of a cured product of the photocurable resin composition;
detaching the mold from the at least one of the peripheral areas; and
sealing at least part of the at least two peripheral areas by placing another of the at least two peripheral areas on the gasket and then pressure bonding the one and the another of the at least two peripheral areas together with the gasket interposed in between.

17. The photocurable resin composition according to claim 1, wherein the ingredient (C) is contained at 0.5 to 50 parts by mass relative to 100 parts by mass of the ingredient (A).

18. The photocurable resin composition according to claim 1, wherein the ingredient (C) is selected from the group consisting of 2-(2-vinyloxyethoxy) ethyl acrylate, and partially acrylated bisphenol A type epoxy resins.

19. The photocurable resin composition according to claim 1, wherein the ingredient (D) is isobornyl methacrylate or dicyclopentanyl methacrylate.

20. The photocurable resin composition according to claim 1, wherein the ingredient (D) is contained at 5 to 200 parts by mass relative to 100 parts by mass of the ingredient (A).

* * * * *